(12) United States Patent
Kubby

(10) Patent No.: US 7,280,044 B2
(45) Date of Patent: Oct. 9, 2007

(54) RFID ACTIVATED PAPERCLIP TAG

(75) Inventor: Joel A. Kubby, Santa Cruz, CA (US)

(73) Assignee: Xerox Corporation, Stamford, CT (US)

( * ) Notice: Subject to any disclaimer, the term of this patent is extended or adjusted under 35 U.S.C. 154(b) by 201 days.

(21) Appl. No.: 11/113,124

(22) Filed: Apr. 25, 2005

(65) Prior Publication Data

US 2006/0238344 A1 Oct. 26, 2006

(51) Int. Cl.
  G08B 13/14 (2006.01)
  B42B 5/06 (2006.01)
(52) U.S. Cl. .............. 340/572.7; 340/572.9; 340/340; 340/572.1
(58) Field of Classification Search ... 340/572.7–572.9
  See application file for complete search history.

(56) References Cited

U.S. PATENT DOCUMENTS

| | | | |
|---|---|---|---|
| 5,450,070 A * | 9/1995 | Massar et al. | 340/825.49 |
| 5,689,238 A * | 11/1997 | Cannon et al. | 340/572.1 |
| 5,959,530 A | 9/1999 | Lupien, Jr. et al. | |
| 6,342,830 B1 * | 1/2002 | Want et al. | 340/10.1 |
| 6,860,422 B2 * | 3/2005 | Hull et al. | 235/376 |
| 6,951,596 B2 * | 10/2005 | Green et al. | 156/264 |
| 7,015,811 B2 * | 3/2006 | Decker et al. | 340/539.22 |
| 7,075,437 B2 * | 7/2006 | Bridgelall et al. | 340/572.1 |
| 7,129,840 B2 * | 10/2006 | Hull et al. | 340/568.1 |
| 2004/0041696 A1 * | 3/2004 | Hull et al. | 340/10.42 |
| 2004/0069829 A1 * | 4/2004 | Watanabe et al. | 227/19 |
| 2006/0176179 A1 * | 8/2006 | Skorpik et al. | 340/572.8 |

OTHER PUBLICATIONS

"Tags," Alien Technology datasheet: http//www.alientechnology.com/webresources/datasheets/TagDatasheet.pdf, Aug. 2004.

* cited by examiner

Primary Examiner—Jeffery Hofsass
Assistant Examiner—Anne V. Lai
(74) Attorney, Agent, or Firm—Oliff & Berridge, PLC

(57) ABSTRACT

Various document tracking techniques may provide an RFID tag for attaching a document that has obverse and reverse faces with the tag disposed on the obverse face. The tag may include a board and an antenna that may connect to the board and may be disposed on the obverse face of the document. The board may include a transceiver and a transponder. The transponder may include an integrated circuit. The antenna may include at least one extending member that extends from the board. The extending member may include a plurality of end segments that may flex so as to be disposed on the reverse face around an edge of the document. The antenna may include an extending member that extends from the board and may be secured to the document by connecting to a deforming staple member. The staple member may include stapling ends disposed on the reverse face by extending the stapling ends through the document and bending along the reverse face. The staple member may be attached to the document subsequent to and independent of the RFID tag being disposed thereon, with the extending member disposed therebetween. Alternatively, the stapling ends may be end segments of the extending member.

11 Claims, 3 Drawing Sheets

RFID ACTIVATED PAPERCLIP TAG

BACKGROUND

This invention relates to a radio frequency identification (RFID) device for use in conjunction with a sheet fastener for document handling.

Inventory control benefits from the introduction of RFID systems used for items being transported, warehoused or sold. Such RFID systems have advantages over the short-range and line-of-sight limitations of bar code identification. An RFID system may include a reader and one or more tags. The reader may propagate a magnetic field or transmit an electric field carrier wave signal. A tag, located within the operating range of the reader and receiving the transmission, may transmit a response signal, which may be used by the reader to identify the tag's information.

An RFID tag may include an antenna, a transceiver and a transponder, and may be passive or active. The antenna may capture the energy from the reader's transmission. The transceiver of the RFID tag may read the transmission frequency of the signal from the reader. The transponder may include an integrated circuit containing the RF circuitry and information to be transmitted. The antenna, transceiver and transponder may be permanently attached and electrically connected to each other by epoxy and/or solder. Passive tags may absorb power received from the reader's transmission to power the circuit and transmit the response. Active tags may include a battery to provide power to operate the integrated circuit. The RFID tag may be associated with a variety of sensors to measure environmental conditions, such as current ambient or maximum exposed values in pressure, temperature, acceleration, navigation, etc. The sensors may be configured as micro-electronic mechanical systems (MEMS) to facilitate integration with the RFID tag.

In general, magnetic field systems may operate at about 125 kHz and over ranges of a few inches, with tag antennas comprising numerous turns of a fine wire around a core. More recent such systems may operate at 13.56 MHz over ranges of a few feet. Electric field systems may employ an antenna having a length of about half a wavelength of the operating frequency.

Passive transponders may be used at up to ultra high frequency (UHF) in the 860-930 MHz band at ranges of about 10 feet with relative temperature insensitivity. With simple integrated circuit and simple antenna and lacking onboard tuned circuits, passive UHF tags may be comparatively inexpensive in large quantities, and thus may require a complex reader to provide system energy, receiver selectivity and frequency stability. Active tags, having an internal power source for the integrated circuit, may be used for toll road applications at shorter ranges and higher microwave frequencies, such as 2.45 GHz and 5.8 GHz. The reader's high-energy field may activate the tag to send, receive, process and store data for the toll fees and the remaining balance. Beacon tags, also having an internal power source, may activate themselves at periodic intervals or when switched on before returning to inactive mode.

A plethora of passive tags in the vicinity of a reader may be used for tracking a high volume of items. Applications for such RFID tags have led to Electronic Product Code (EPC) specifications and tag manufacturing processes such as fluidic self-assembly by Alien Technology of Morgan Hill, Calif. EPC communication protocols of tags range in sophistication from Class 0 for read-only (factory programmable) to Class 4 for relay (inter-tag communication). Class 0 compliant tags may use electrically erasable programmable read-only memory (EEPROM), while Class 1 compliant tags may use write-once, read-many (WORM) capable chips.

SUMMARY

Various document tracking techniques may provide an RFID tag for attaching a document that has obverse and reverse faces with the tag disposed on the obverse face. The tag includes a board having a transceiver and a transponder, the latter of which includes an integrated circuit, and an antenna connected to the board and shaped with a plurality of end segments. The end segments are flexible to be disposed on the reverse face around at least one edge of the document.

Various document tracking techniques may provide an RFID tag for attaching a document that has obverse and reverse faces with the tag disposed on the obverse face. The tag includes a board having a transceiver and a transponder, the latter of which includes an integrated circuit, and an antenna connected to the board and shaped with end segments that are secured by a deforming stapling member. The stapling member includes stapling ends to be disposed on the reverse face by extending through the document.

In various exemplary embodiments, the antenna comprises first and second layers. The first layer is an electrically conductive material, while the second layer is a mechanically resilient material.

In various exemplary embodiments, the integrated circuit further includes a MEMS sensor to receive sensory information therefrom. In various exemplary embodiments, the integrated circuit is programmable.

BRIEF DESCRIPTION OF THE DRAWINGS

Various details are described below with reference to the following figures, wherein.

DETAILED DESCRIPTION OF EMBODIMENTS

The following detailed description refers to RFID sheet fasteners associated with documents. The RFID tags may refer to, for example, passive UHF transponders, and the fasteners, may refer to, for example, paperclips, staples, and the like, for sake of clarity and familiarity. However, it should be appreciated that the principles described herein may be equally applied to any known or later-developed RFID sheet fasteners, beyond the examples specifically discussed herein.

For document tracking, an RFID tag may be attached to the pages for a document. The RFID tag may be interrogated by a carrier wave signal from a reader. For a Class 1 tag, the integrated processor may be programmed to associate the document with a unique document serial number. A Class 0 tag may be used for multiple copies of a standard document, such as a user's manual or other publication. The RFID tag may be dispensed and attached automatically to the document at the time of document processing and assembly. Alternatively, the RFID tag may be retrieved from a loose repository of such devices and attached to the document manually. Upon disposal of the document, the RFID tag may be detached from the document and retained in storage until reused.

For the RFID tag to serve as a paperclip, the antenna may be designed to additionally secure document sheets by friction. The ALL-9238 tag by Alien Technology features an exemplary "Squiggle™" antenna design that may serve such a paper securing function when adapted to do so, although other antenna designs may also be used. The UHF Squiggle antenna has dimensions of $2^{11}/_{16}$ inches (9.5 cm) by $5/_{16}$ inch (0.8 cm). The ALL-9238 tag may operate at 915 MHz (wavelength $\lambda$=32.7 cm) and may store in memory an ample 64-bits of data for the presently anticipated demand for component serial numbers.

Figure 1:
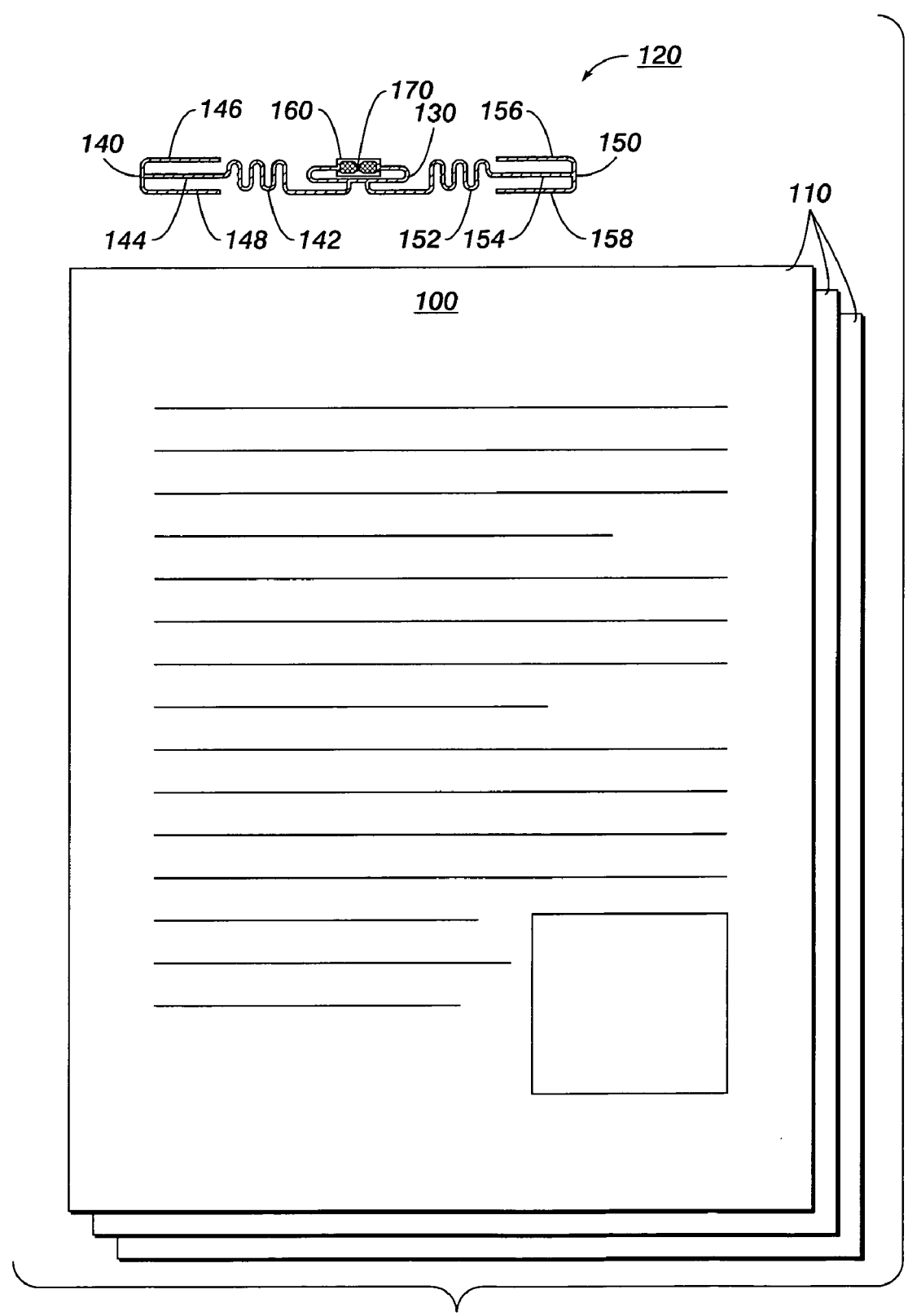
FIG. 1 shows an exemplary plan view of an RFID tag and an associated document.

FIG. 1 shows an exemplary plan view of a document 100 comprising sheets 110 and an RFID tag 120 unattached to the document 100. The RFID tag 120 (not to scale with the document) may include an antenna yoke 130, a first antenna wing 140, a second antenna wing 150, and a board 160 that may contain a transceiver and a transponder with an integrated circuit 170. The board 160 may be connected to the antenna yoke 130. The first antenna wing 140 may include a first undulating spoke 142 extending from the yoke 130, and a first fork 144 having first and second prongs or end segments 146, 148. The second antenna wing 150 may include a second undulating spoke 152 extending from the yoke 130, and a second fork 154 having third and fourth prongs or end segments 156, 158.

Figure 2:
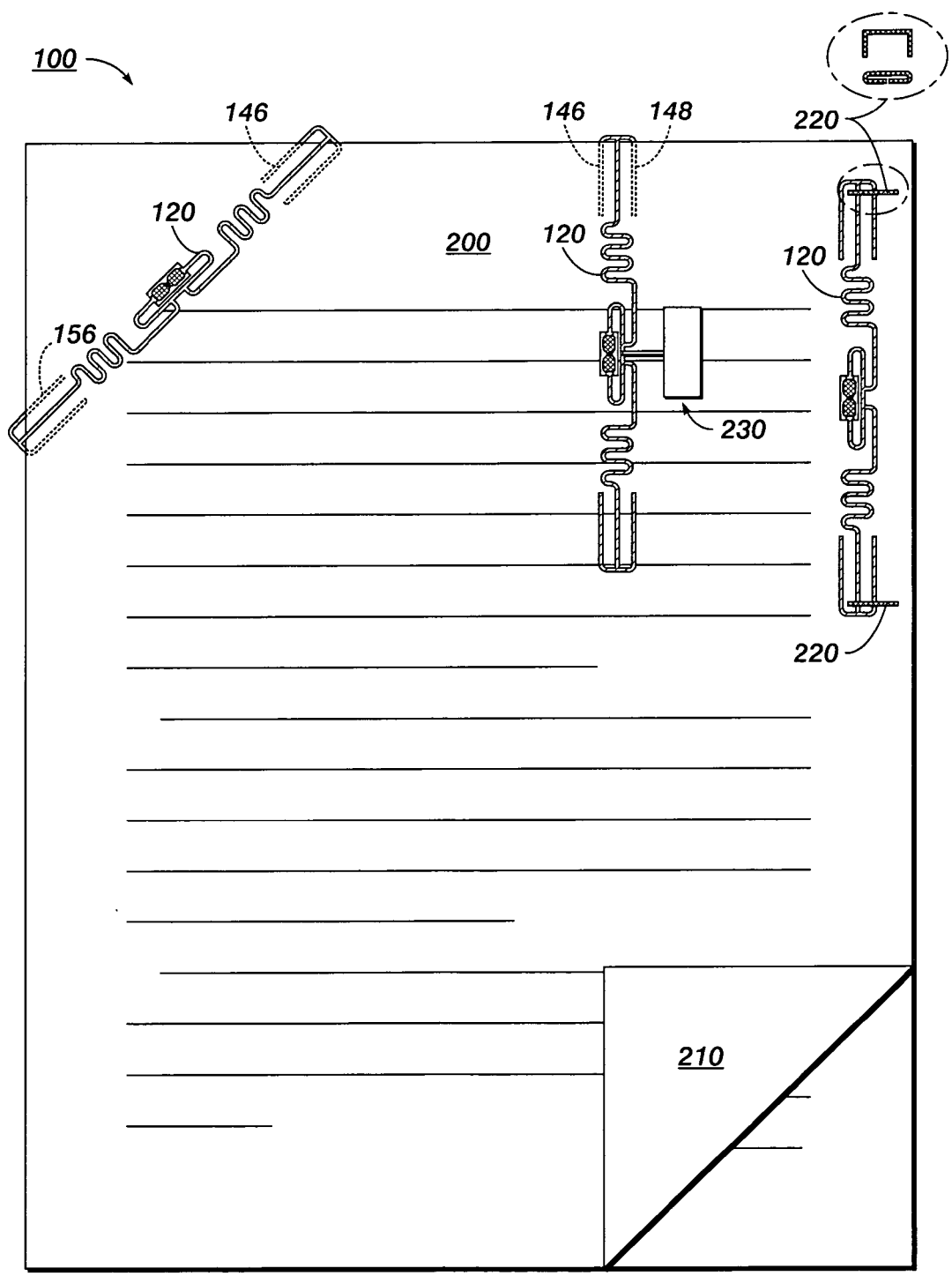
FIG. 2 shows an exemplary plan view of an RFID tag attached to a document.

FIG. 2 shows an exemplary plan view of the document 100 with the RFID tag 120 attached to the document 100 in three exemplary manners. In the first example, the document 100 may be secured to the RFID tag 120 so that the first and second prongs 146, 148 of the first fork 144 may elastically bend or deform to slide underneath all the sheets 110 of the document 100. In the second example, the first and third prongs 146, 156 may flex or bend to slide under all the sheets 110. The prongs may flex in either elastic or plastic deformation. The RFID tag 120 may thereby be disposed on the obverse face 200 of the document 100, while the bent prongs may be disposed on the reverse face 210 of the document 100.

In the third example, one or more staples 220 may be inserted over positions along the antenna wings 140, 150, such as the first and second forks 144, 154. The staple may include deformable ends designed to penetrate through the sheets 110 and bend to be disposed along the reverse face 210. A stapling device may project and bend the deformable ends to attach the staple to the document 100. The stapling device may alternatively project and bend one or more of the prongs 146, 148, 156, 158 through the sheets 110 of the document 100. Additionally or alter-natively, MEMS sensors 230 may be connected to the board 160 or the staples 220 to provide environmental and other sensory information to the integrated circuit 170.

Figure 3:
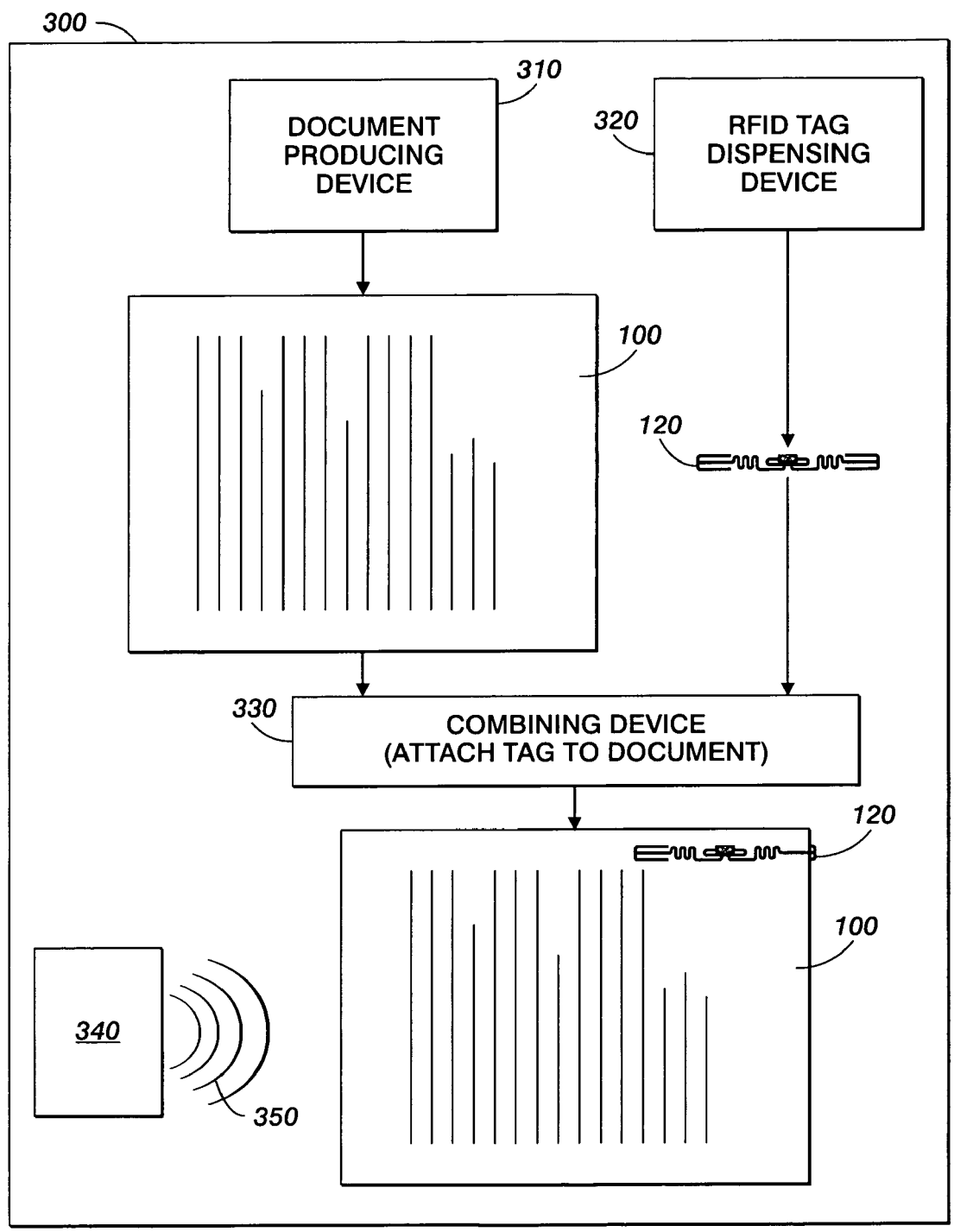
FIG. 3 shows an exemplary block diagram for a system to attach an RFID to a document.

FIG. 3 shows an exemplary block diagram of a document processing system 300. The system 300 includes a document producing device 310 to provide the documents 100, an RFID tag dispensing device 320 to provide the RFID tags 120, and a combining device 330 to attach an RFID tag 120 to a corresponding document 100. For an EPC Class 0 RFID tag, the dispensing device 320 may program the integrated circuit 170 with preset or default identification instructions. For an EPC Class 1 RFID tag, the combining device 330 may program the integrated circuit 170 with WORM identification instructions specific to the content or other characteristics of the document 100 to which the RFID tag 120 may be attached. A remote reader 340 may illuminate the RFID tag 120 at the operating frequency by transmitting a carrier wave signal 350, to which the RFID tag 120 may respond with the document identification information associated therewith.

To improve structural resilience of the antenna for use as a paperclip, the antenna may include a core comprising an electrically conductive metal (e.g., copper, aluminum) to receive and transmit electrical signals and either surrounded or overlaid with a mechanically resilient material to absorb stresses from bending and securing the document. Alternatively, the antenna may be a core comprising the mechanically resilient material and either surrounded over overlaid with the conductive metal.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art that are also intended to be encompassed by the following claims.

What is claimed is:

1. An RFID tag for attaching to at least one document having an obverse face and a reverse face, the RFID tag disposed on the obverse face and comprising:
    a board including a transceiver and a transponder including an integrated circuit; and
    an antenna connected to the board, the antenna including at least one extending member that extends from the board, the at least one extending member including a plurality of end segments, wherein the end segments flex to be disposed on the reverse face to extend around at least one edge of the at least one document to fasten the RFID tag to the document.

2. The RFID tag according to claim 1, wherein the antenna comprises a first layer and a second layer, wherein the first layer is an electrically conductive material, and the second layer is a mechanically resilient material.

3. The RFID tag according to claim 1, wherein the end segment flexes in one of elastic deformation and plastic deformation.

4. The RFID tag according to claim 1, wherein the integrated circuit further includes a MEMS sensor to receive sensory information therefrom.

5. The RFID tag according to claim 1, wherein the integrated circuit is programmable.

6. The RFID tag according to claim 1, wherein the RFID tag is dispensed from a Xerographic device and attached to the at least one document thereby.

7. A method of attaching an RFID tag to at least one document, the RFID tag including a board and an antenna connected to the board, the board including a transceiver and a transponder with an integrated circuit, the antenna including at least one extending member that extends from the board, the at least one extending member including a plurality of end segments, the at least one document including obverse and reverse faces, the method comprising:

dispensing the RFID tag from a repository; and disposing the RFID tag on the obverse face of the at least one document, wherein disposing the RFID tag onto the obverse face further includes flexing at least one of the plurality of end segments to be disposed on the reverse face to extend around at least one edge of the at least one document.

8. The method according to claim 7, further including: programming the integrated circuit of the RFID tag.

9. The method according to claim 7, further including: connecting a MEMS sensor to the integrated circuit; and providing sensory information from the MEMS sensor to the integrated circuit.

10. The method according to claim 7, wherein flexing at least one of the plurality of end segments includes flexing in one of elastic deformation and plastic deformation.

11. The method according to claim 7, wherein disposing the RFID tag form a repository comprises dispensing the RFID tag from a Xerographic device.

* * * * *